(12) United States Patent
Lecue et al.

(10) Patent No.: US 10,474,495 B2
(45) Date of Patent: Nov. 12, 2019

(54) UTILIZING AN ARTIFICIAL INTELLIGENCE MODEL DETERMINED FOR A TARGET DOMAIN BASED ON A DATASET ASSOCIATED WITH A SOURCE DOMAIN

(71) Applicant: Accenture Global Solutions Limited, Dublin (IE)

(72) Inventors: Freddy Lecue, Castleknock (IE); Mohammad Karzand, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 32 days.

(21) Appl. No.: 15/864,257

(22) Filed: Jan. 8, 2018

(65) Prior Publication Data

US 2019/0213039 A1    Jul. 11, 2019

(51) Int. Cl.
*G06N 5/02* (2006.01)
*G06F 9/48* (2006.01)

(52) U.S. Cl.
CPC ............. *G06F 9/4881* (2013.01); *G06N 5/02* (2013.01); *G06F 2216/03* (2013.01)

(58) Field of Classification Search
CPC .......... G06N 5/02; G06N 5/04; G06F 9/4881; G06F 2216/03
See application file for complete search history.

(56) References Cited

U.S. PATENT DOCUMENTS

| | | | | |
|---|---|---|---|---|
| 8,229,929 B2* | 7/2012 | Achtermann | ......... | G06F 16/285 707/737 |
| 9,038,172 B2* | 5/2015 | Miller | ................... | G06F 21/554 726/22 |
| 2008/0307430 A1* | 12/2008 | Friedlander | ............ | G06Q 50/22 719/313 |
| 2014/0280221 A1* | 9/2014 | Chuang | ............... | G06F 17/3053 707/748 |
| 2016/0275413 A1 | 9/2016 | Shi et al. | | |

(Continued)

OTHER PUBLICATIONS

Jin Xiao, Ling Xie, Dunhu Liu, Yi Xiao, and Yi Hu, "A Clustering and Selection Based Transfer Ensemble Model for Customer Credit Scoring", 2016, Filomat 30:15 (2016), pp. 4015-4026. (Year: 2016).*

(Continued)

*Primary Examiner* — Kamran Afshar
*Assistant Examiner* — Ying Yu Chen
(74) *Attorney, Agent, or Firm* — Harrity & Harrity, LLP

(57) ABSTRACT

A device receives source data, target data, external data, and a target task, and generates features of and differentiators between the source data and the target data. The device identifies a set of mappings between the source data and the target data based on the features and the differentiators, and determines different clusters of the source data based on the external data, the features, and the differentiators. The device generates, based on the external data, a set of artificial intelligence (AI) models as candidates to perform the target task, and generates a performance measure for the set of AI models based on the features, the differentiators, and the external data. The device refines the set of mappings, and identifies an AI model, from the set of AI models, to perform the target task based on the different clusters of the source data and based on the performance measure.

20 Claims, 12 Drawing Sheets

(56) References Cited

U.S. PATENT DOCUMENTS

| | | | |
|---|---|---|---|
| 2017/0011306 A1* | 1/2017 | Kim | G06N 99/005 |
| 2017/0193392 A1 | 7/2017 | Liu et al. | |
| 2017/0220951 A1* | 8/2017 | Chidlovskii | G06N 99/005 |
| 2017/0300783 A1* | 10/2017 | Kumar | G06K 9/6245 |
| 2018/0052857 A1* | 2/2018 | Jagmohan | G06F 17/3089 |

OTHER PUBLICATIONS

Yen-Chang Hsu, Zhaoyang Lv, and Zsolt Kira, "Learning to Cluster in Order to Transfer Across Domains and Tasks", Nov. 28, 2017, arXiv, pp. 1-19. (Year: 2017).*

Peiguang Jing, Yuting Su, Liqiang Nie, and Huimin Gu, "Predicting Image Memorability Through Adaptive Transfer Learning From External Sources", Dec. 23, 2016, IEEE Transactions on Multimedia, vol. 19, No. 5, May 2017, pp. 1050-1062. (Year: 2016).*

Feurer M., et al., "Efficient and Robust Automated Machine Learning", Neural Information Processing Systems (NIPS), 2015, [Retrieved on Oct. 9, 2019] Retrieved from the internet [URL: https://papers.nips.cc/paper/5872-efficient-and-robust-automated-machine-learning].

Swearingen T., et al., "ATM: A Distributed, Collaborative, Scalable System for Automated Machine Learning", 2017 IEEE International Conference on Big Data, 2017, pp. 151-162. [Retrieved on Oct. 9, 2019] Retrieved from the internet [URL: https://ieeexplore.ieee.org/document/8257923].

* cited by examiner

UTILIZING AN ARTIFICIAL INTELLIGENCE MODEL DETERMINED FOR A TARGET DOMAIN BASED ON A DATASET ASSOCIATED WITH A SOURCE DOMAIN

BACKGROUND

Artificial intelligence describes different ways that a machine interacts with a world around it. Through advanced, human-like intelligence (e.g., provided by software and hardware), an artificial intelligence model can mimic human behavior or perform tasks as if the artificial intelligence model were human. Machine learning is an approach, or a subset, of artificial intelligence, with an emphasis on learning rather than just computer programming. In machine learning, a device utilizes complex models to analyze a massive amount of data, recognize patterns among the data, and make a prediction without requiring a person to program specific instructions. Deep learning is a subset of machine learning, and utilizes massive amounts of data and computing power to simulate deep neural networks. Essentially, these networks classify datasets and find correlations between the datasets. With newfound knowledge (acquired without human intervention), deep learning can apply the knowledge to other datasets. Artificial intelligence models have found great success in practical applications. Computer vision, speech recognition, and language translation have all seen a near human level performance with the help of artificial intelligence models.

SUMMARY

According to some implementations, a device may include one or more memories, and one or more processors, communicatively coupled to the one or more memories, to receive source data, target data, external data, and a target task associated with the source data and the target data, and generate features of and differentiators between the source data and the target data. The one or more processors may identify a set of mappings between the source data and the target data based on the features of and the differentiators between the source data and the target data, and may determine different clusters of the source data based on the external data and the features of and the differentiators between the source data and the target data. The one or more processors may generate, based on the external data, a set of artificial intelligence models as candidates to perform the target task, and may generate a performance measure for the set of artificial intelligence models based on the features of and the differentiators between the source data and the target data, and based on the external data. The one or more processors may refine the set of mappings based on the different clusters of the source data and based on the performance measure, and may identify an artificial intelligence model, from the set of artificial intelligence models, to perform the target task based on the different clusters of the source data and based on the performance measure.

According to some implementations, a non-transitory computer-readable medium may store instructions that include one or more instructions that, when executed by one or more processors, cause the one or more processors to receive source data, target data, external data, and a target task associated with the source data and the target data, where the source data is associated with a source domain, the target data is associated with a target domain that is different than the source domain, and the external data is associated with the source data and the target data. The one or more instructions may cause the one or more processors to generate features of the source data and the target data, and generate differentiators between the source data and the target data based on the features of the source data and the target data. The one or more instructions may cause the one or more processors to identify a set of mappings between the source data and the target data based on the features of the source data and the target data and the differentiators between the source data and the target data, and determine different clusters of the source data based on the external data, the features of the source data and the target data, and the differentiators between the source data and the target data. The one or more instructions may cause the one or more processors to generate, based on the external data, a set of artificial intelligence models as candidates to perform the target task, and generate a performance measure for the set of artificial intelligence models based on the features of the source data and the target data, the differentiators between the source data and the target data, the set of mappings, and the different clusters of the source data. The one or more instructions may cause the one or more processors to identify an artificial intelligence model, from the set of artificial intelligence models, to perform the target task based on the set of mappings, the different clusters of the source data, and the performance measure.

According to some implementations, a method may include receiving, by a device, source data, target data, external data, and a target task associated with the source data and the target data, and generating, by the device, features of and differentiators between the source data and the target data. The method may include identifying, by the device, a set of mappings between the source data and the target data based on the features of and the differentiators between the source data and the target data, and determining, by the device, different clusters of the source data based on the external data and the features of and the differentiators between the source data and the target data. The method may include generating, by the device and based on the external data, a set of artificial intelligence models as candidates to perform the target task, and generating, by the device, a performance measure for the set of artificial intelligence models based on the features of and the differentiators between the source data and the target data, the set of mappings, and the different clusters of the source data. The method may include identifying, by the device, an artificial intelligence model, from the set of artificial intelligence models, to perform the target task based on the set of mappings, the different clusters of the source data, and the performance measure.

DETAILED DESCRIPTION

The following detailed description of example implementations refers to the accompanying drawings. The same reference numbers in different drawings may identify the same or similar elements.

Prediction systems rely on artificial intelligence (AI) models (e.g., machine learning models) and large amount of cleansed and representative data (e.g., training data for particular domains) that is used to train the AI models for the particular domains. Robust prediction systems rely on AI models that are robust to changing data (e.g., unseen data). However, many AI models are non-robust and non-applicable to domains outside of the particular domains used to train the AI models (e.g., predicting United States flight data using an AI model trained with European flight data). Therefore, many AI models cannot be applied or transferred across different domains.

Some implementations described herein provide a model determination platform that determines an AI model for a target domain based on a dataset associated with a source domain that is different than the target domain. For example, the model determination platform may receive source data (e.g., associated with a source domain), target data (e.g., associated with a target domain that is different than the source domain), external data (e.g., weather data, calendar data, and/or the like), and a target task associated with the source data and the target data. The model determination platform may generate features of and differentiators between the source data and the target data, and may identify a set of mappings between the source data and the target data based on the features. The model determination platform may determine different clusters of the source data based on the features, the differentiators, and/or the external data, and may generate, based on the external data, a set of AI models to perform the target task. The model determination platform may generate a performance measure for the set of AI models based on the features, the differentiators, the set of mappings, and/or the different clusters, and may identify an AI model from the set of AI models based on the set of mappings, the different clusters, and/or the performance measure. The model determination platform may utilize the identified AI model to perform the target task.

Figure 1A:
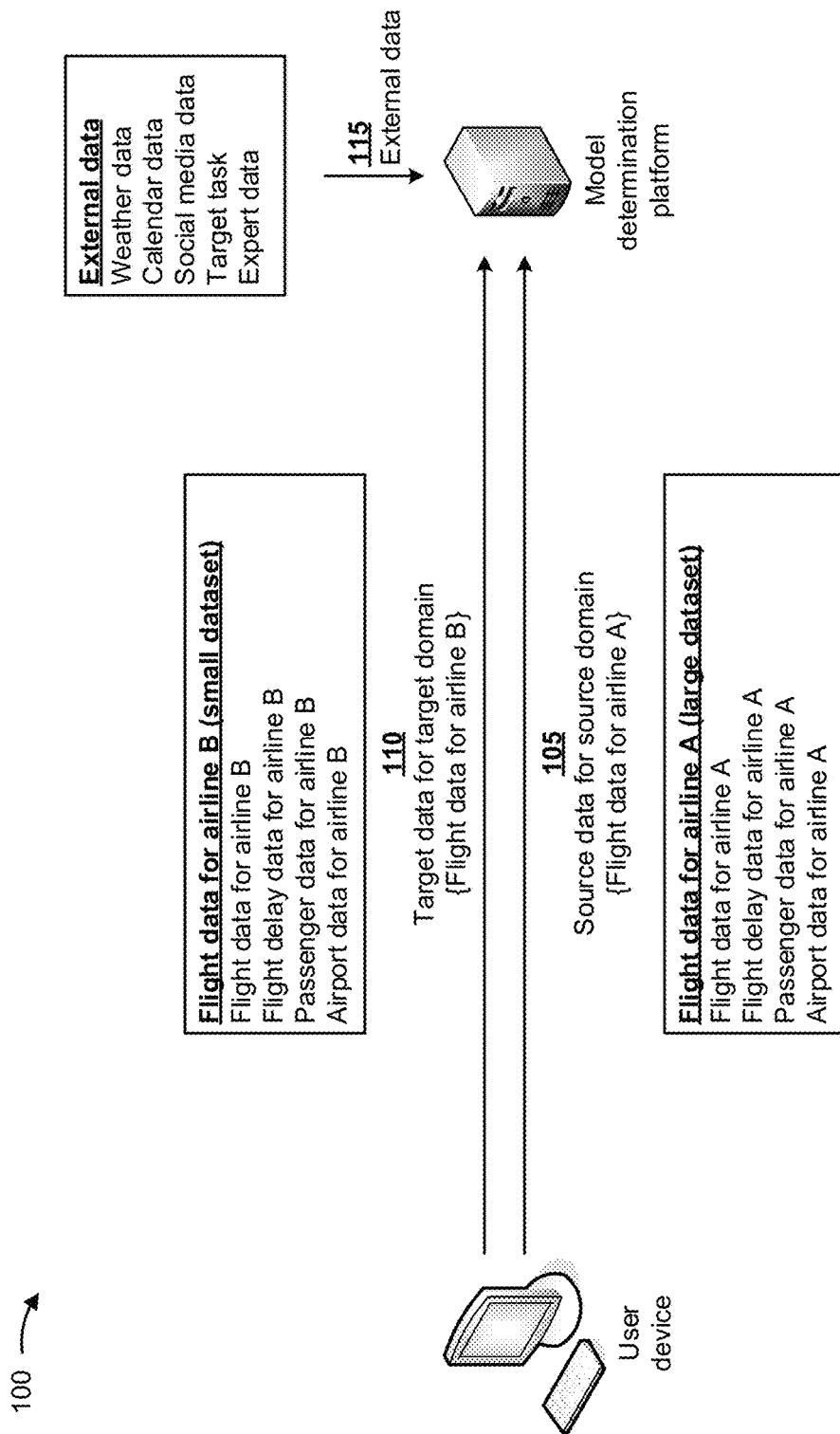
FIGS. 1A-1I are diagrams of an overview of an example implementation described herein.

FIGS. 1A-1I are diagrams of an overview of an example implementation 100 described herein. As shown in FIG. 1A, a user device may be associated with a model determination platform. As shown in FIG. 1A, and by reference number 105, a user of the user device (e.g., via a user interface provided to the user) may cause the user device to provide, to the model determination platform, source data for a source domain (e.g., flight data for an airline A, which includes a large, well-defined dataset). As further shown in FIG. 1A, and by reference number 110, the user may cause the user device to provide, to the model determination platform, target data for a target domain that is different than the source domain (e.g., flight data for an airline B, which includes a small, undefined dataset). In some implementations, the source data and the target data may not be stored in the user device, but the user device may cause the source data and the target data to be provided from one or more resources, storing the source data and the target data, to the model determination platform. In some implementations, the model determination platform may receive the source data and the target data, and may store the source data and the target data in a memory associated with the model determination platform.

In some implementations, the source data may include data, associated with the source domain, which may be used to train AI models. For example, since the source domain relates to airline A, the source data may include flight data for airline A (e.g., data indicating a quantity of daily flights offered by airline A, destination locations of the daily flights, departure locations of the daily flights, times associated with the daily flights, and/or the like), flight delay data for airline A (e.g., data indicating an average delay time for all flights of airline A, causes of flight delays for airline A, and/or the like), passenger data for airline A (e.g., data indicating whether airline A identifies its passengers, a quantity of unfilled flights of airline A, and/or the like), airport data for airline A (e.g., data indicating departure locations for flights of airline A, destination locations for flights of airline A, and/or the like), baggage data for airline A (e.g., data indicating a number of bags that can be brought on board of flights of airline A, and/or the like), and/or the like.

In some implementations, the target data may include data, associated with the target domain, which may be used to train AI models. For example, since the target domain relates to airline B, the source data may include flight data for airline B (e.g., data indicating a quantity of daily flights offered by airline B, destination locations of the daily flights, departure locations of the daily flights, times associated with the daily flights, and/or the like), flight delay data for airline B (e.g., data indicating an average delay time for all flights of airline B, causes of flight delays for airline B, and/or the like), passenger data for airline B (e.g., data indicating whether airline B identifies its passengers, a quantity of unfilled flights of airline B, and/or the like), airport data for airline B (e.g., data indicating departure locations for flights of airline B, destination locations for flights of airline B, and/or the like), baggage data for airline B (e.g., data indicating a number of bags that can be brought on board of flights of airline B, and/or the like), and/or the like.

As further shown in FIG. 1A, and by reference number 115, the model determination platform may receive external data, related to the source domain and the target domain, from an external source. In some implementations, the external data may include weather data (e.g., data indicating weather conditions associated with the destination locations and the departure locations of airline A and airline B), calendar data (e.g., data indicating whether the flights associated with airline A and airline B occur during weekends, holidays, and/or the like), social media data (e.g., data indicating customers sentiments about airline A and airline B, such as complaints by customers about the timeliness of the flights of airline A and/or airline B), a target task (e.g., a task that is associated with the source data and the target data, such as predicting flight delays for airline A and airline B), expert data (e.g., data indicating AI models that may be used with the source data and the target data, such as AI models that may be used to predict flight delays for airlines, data indicating different factors that may have an impact on a target task, such as the effect of weather information on predicting flight delay, and/or the like), and/or the like. In some implementations, the target task may be provided by the user device to the model determination platform.

Figure 1B:
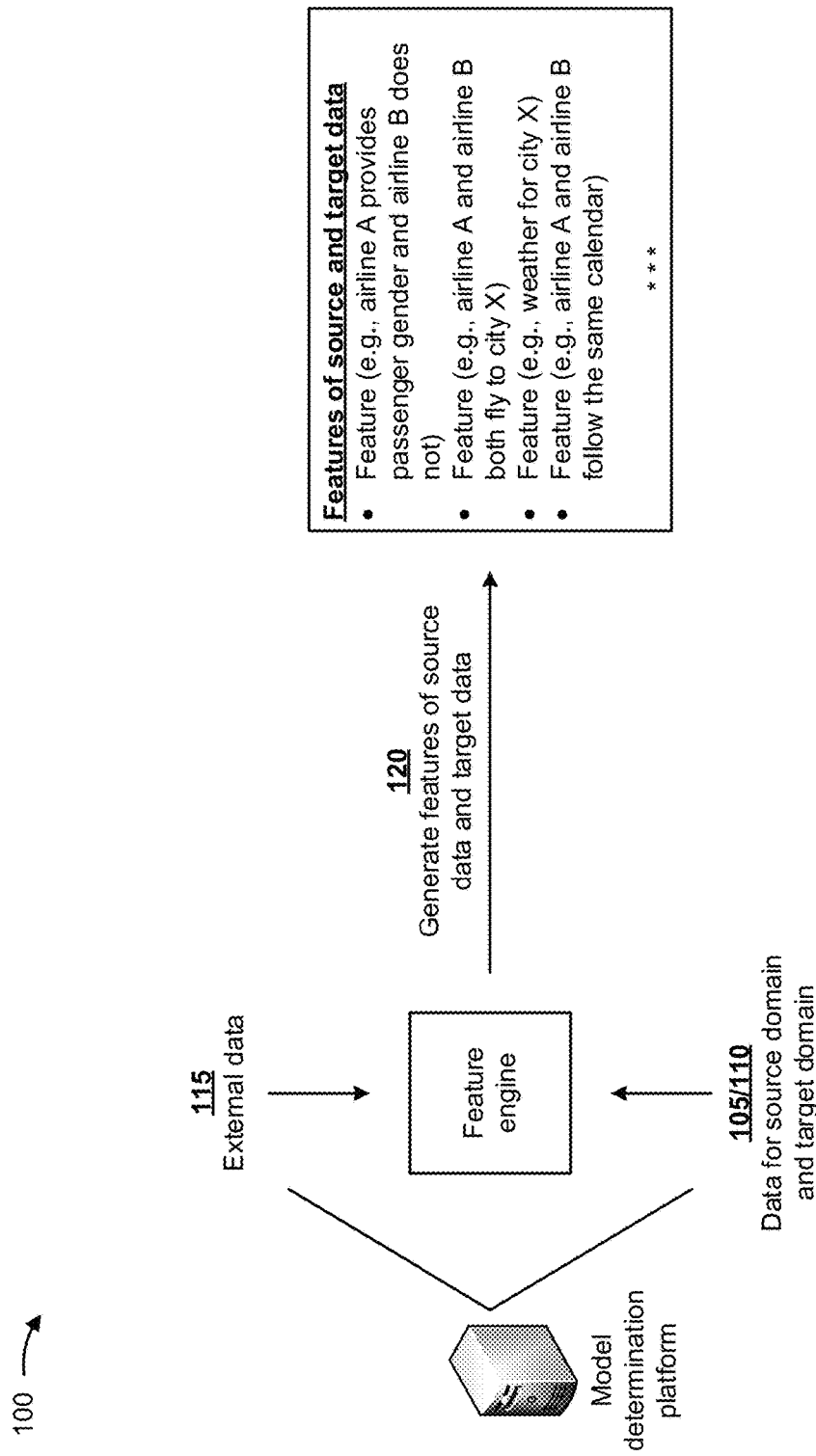

As shown in FIG. 1B, and by reference numbers 105, 110, and 115, a feature engine, of the model determination platform, may receive the source data, the target data, and the external data. In some implementations, the model determination platform may convert the source data, the target data, and the external data from a format received by the model determination platform into another format (e.g., a resource descriptive framework (RDF) format).

As further shown in FIG. 1B, and by reference number 120, the feature engine may generate features of the source data and the target data based on the source data, the target data, and the external data. In some implementations, the features of the source data and the target data may include a feature indicating that airline A provides passenger gender information and airline B does not, a feature indicating that airline A and airline B both fly to city X, a feature indicating weather for city X, a feature indicating that airline A and airline B follow the same calendar, a feature indicating that airline A services fifty cities that airline B does not service, a feature indicating that both airline A and airline B provide passenger age information, and/or the like.

In some implementations, the feature engine may utilize a schema matching technique to generate the features of the source data and the target data. The schema matching technique may include determining semantic correspondences between elements of two schemas (e.g., the source data and the target data). In some implementations, the schema matching technique may analyze and compare the schema to determine correspondences among concepts and to detect possible conflicts. In some implementations, the schema matching technique may include a schema-level matching technique (e.g., that considers schema information and not instance data), an instance-level matching technique (e.g., that uses instance-level data to gather insights into contents and meanings of schema elements), a hybrid matching technique (e.g., that combines several matching techniques to determine match candidates based on multiple criteria or information sources), a reusing matching information technique (e.g., that reuses previous matching information as auxiliary information for future matching tasks), and/or the like.

In some implementations, the feature engine may utilize other techniques to generate the features of the source data and the target data, such as machine learning techniques, and/or the like. For example, the feature engine may utilize a Gaussian model (e.g., a Bayesian or multivariate Gaussian mixture model) to generate the features of the source data and the target data. The multivariate Gaussian mixture model may include a model used to fit a vector of unknown parameters or multivariate normal distributions.

Figure 1C:
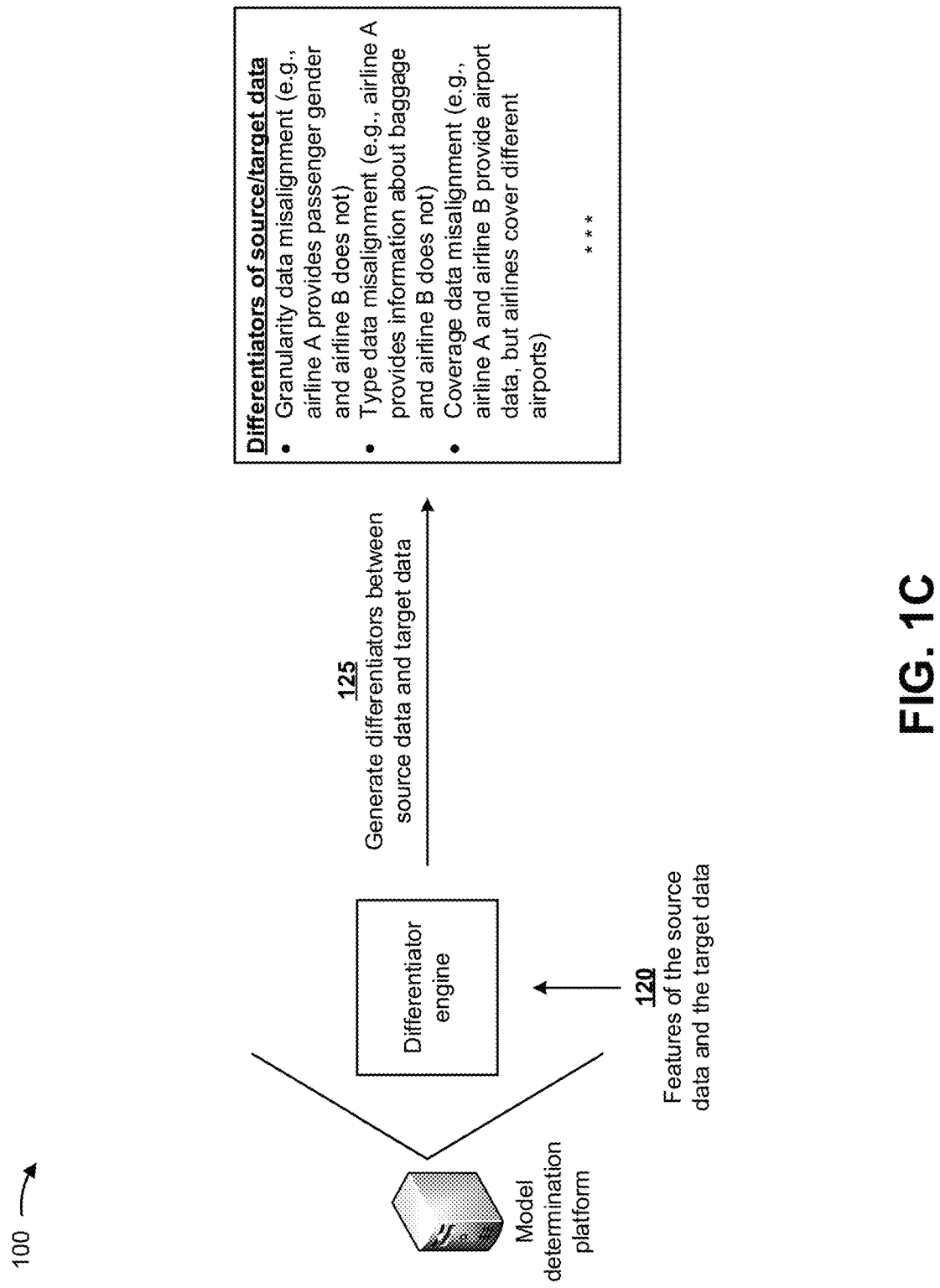

As shown in FIG. 1C, and by reference number 120, a differentiator engine, of the model determination platform, may receive the features of the source data and the target data. As further shown in FIG. 1C, and by reference number 125, the differentiator engine may generate differentiators between the source data and the target data based on the features of the source data and the target data. In some implementations, the differentiators between the source data and the target data may include data indicating granularity data misalignment (e.g., data indicating that airline A provides passenger gender information and airline B does not), data indicating type data misalignment (e.g., data indicating that airline A provides information about baggage and airline B does not), data indicating coverage data misalignment (e.g., data indicating that airline A and airline B provide airport data, but the airlines cover different airports), and/or the like.

In some implementations, the differentiator engine may utilize the schema matching technique to generate the differentiators between the source data and the target data. The schema matching technique may include determining semantic correspondences between elements of two schemas (e.g., the source data and the target data). In some implementations, the schema matching technique may analyze and compare the schema to determine correspondences among concepts and to determine the differences among the concepts (e.g., the differentiators between the source data and the target data).

In some implementations, the differentiator engine may utilize other techniques to generate the differentiators between the source data and the target data, such as machine learning techniques, and/or the like.

Figure 1D:
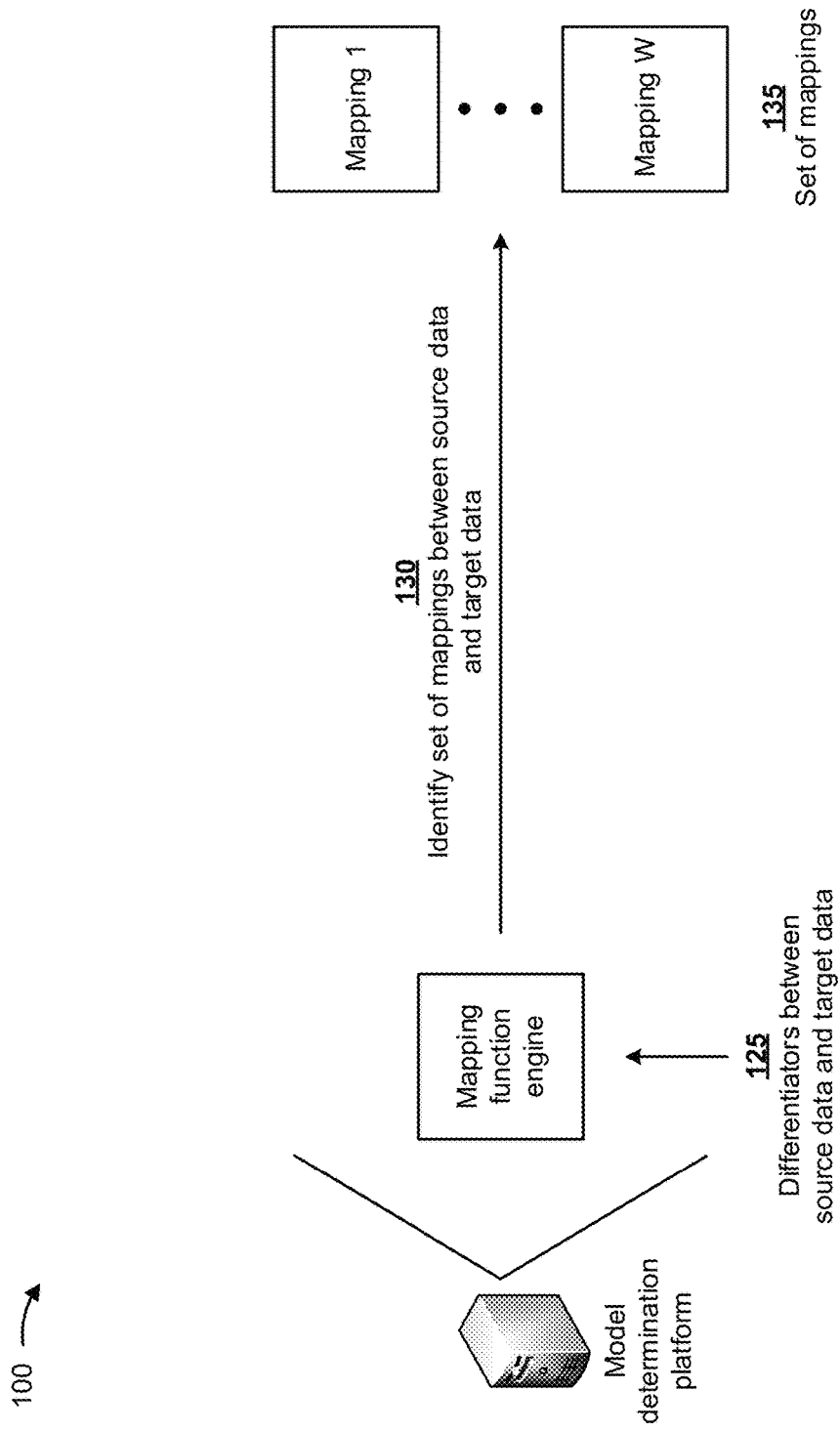

As shown in FIG. 1D, and by reference number 125, a mapping function engine, of the model determination platform, may receive the differentiators between the source data and the target data. As further shown in FIG. 1D, and by reference number 130, the mapping function engine may identify a set of mappings (e.g., mappings 1 through mapping W) between the source data and the target data based on the differentiators between the source data and the target data. In some implementations, the set of mappings between the source data and the target data may include mappings that may be used to embed or transfer data from the source data to the target data (e.g., even if some of the data is misaligned). In some implementations, each mapping may be dependent on a level of misalignment between the source data and the target data.

In some implementations, the mapping function engine may utilize a data mapping technique to identify the set of mappings between the source data and the target data. The data mapping technique may create data element mappings (e.g., the mappings of the set of mappings) between two distinct data models (e.g., the source data and the target data). In some implementations the data mapping technique may include a data-driven mapping technique (e.g., simultaneously evaluating actual data values in two data sources using heuristics and statistics to automatically discover complex mappings between two datasets), a semantic mapping technique (e.g., that utilizes a metadata registry to look up data element synonyms), and/or the like.

In some implementations, the mapping function engine may utilize a nonlinear data mapping technique, which utilizes neural networks, to identify the set of mappings between the source data and the target data. The nonlinear data mapping by neural networks may include representing nonlinear mappings by a neural network that is trained based on unsupervised techniques (e.g., vector quantization techniques, subspaces techniques, probability density functions, and/or the like), supervised techniques (e.g., learning vector quantization techniques, subspaces techniques, probability density functions, and/or the like), and/or the like.

Figure 1E:
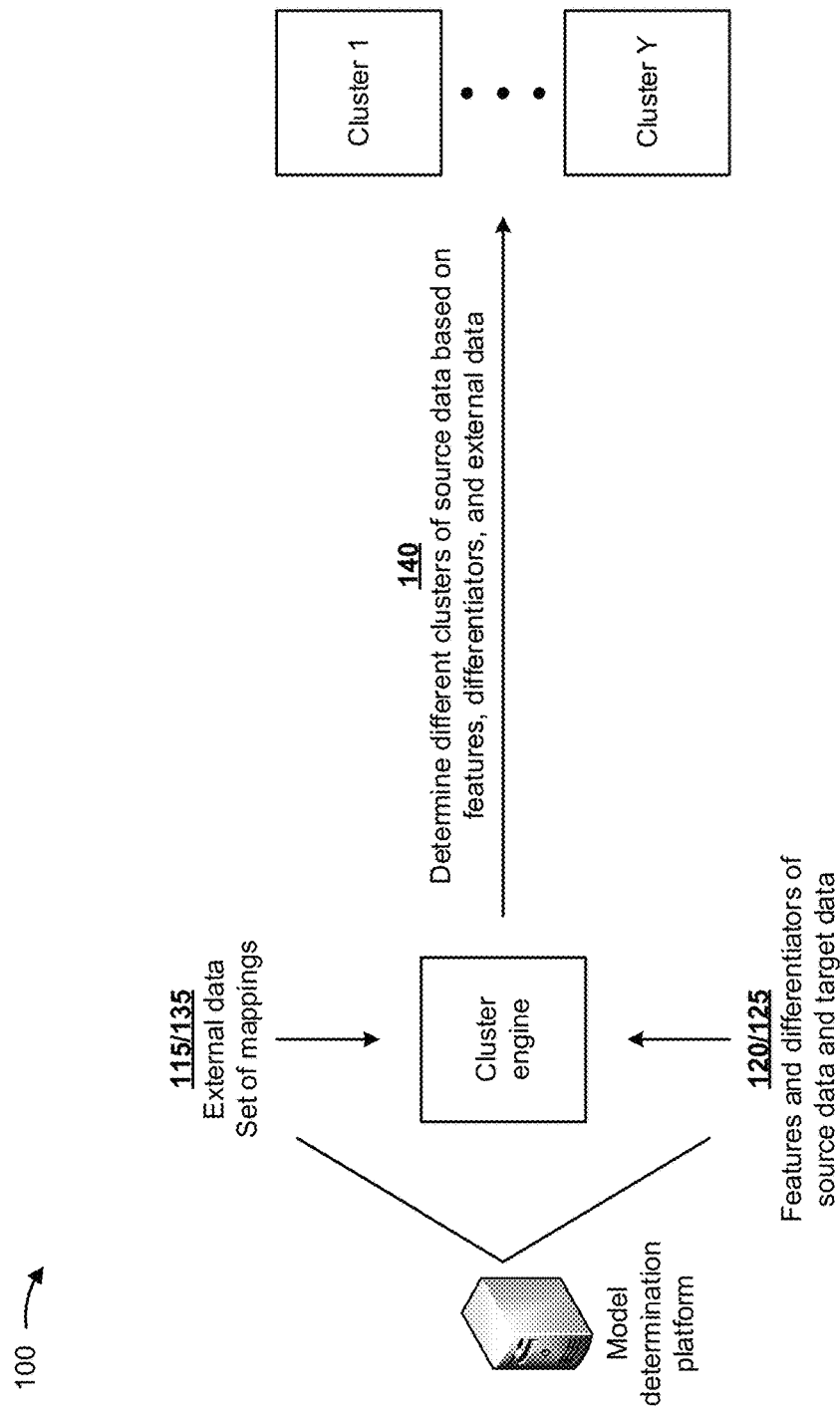

As shown in FIG. 1E, and by reference numbers 115, 120, 125, and 135, a cluster engine, of the model determination platform, may receive the external data, the features of the source data and the target data, the differentiators between the source data and the target data, and the set of mappings. As further shown in FIG. 1E, and by reference number 140, the cluster engine may determine different clusters of the source data based on the external data, the features of the source data and the target data, the differentiators between the source data and the target data, the data indicating different factors that have an effect on the target task, and/or the like. In some implementations, the cluster engine may utilize data associated with the target task (e.g., predicting flight delays for airline A and airline B) from the external data (e.g., data indicating what is important for determining a flight delay) when determining the different clusters of the source data. In some implementations, if the differentiators between the source data and the target data indicate that alignment of the source data and the target data may be possible, the cluster engine may utilize the set of mappings to force alignment of the source data and the target data (e.g., even if the alignment is not perfect).

In some implementations, each cluster of the source data may include source data with features that may be grouped together and used later for transferring to the target data. In some implementations, determination of the different clusters of the source data may prevent a negative transfer (e.g., where one or more portions of the source data in a particular cluster may not be beneficial and/or relevant to the target data and the target task, and may cause inaccuracies). In some implementations, the cluster engine may associate a cluster importance factor (e.g., a weighting factor that may be determined through a relationship analysis based on relevance of information) to each cluster. For example, in the case of prediction of flight delay for a flight of airline B, the cluster engine may cluster the source data based on a departure airport of the flight, weather conditions and a trip time associated with a previous leg of the flight, a type of an aircraft for the flight, a quantity of legs for the flight, and/or the like.

In some implementations, the cluster engine may utilize a cluster analysis technique to determine the different clusters of the source data. The cluster analysis technique may include grouping a set of data in such a way that data in a same group (e.g., a cluster) is more similar to each other than to data in other groups (e.g., clusters). In some implementations, the cluster analysis technique may include a hierarchical clustering technique (e.g., based on the idea that objects are more related to nearby objects than the objects are to objects farther away), a centroid-based clustering technique (e.g., where clusters may be represented by a central vector, which may not be a member of the dataset), a distribution-based clustering technique (e.g., where clusters may be defined as objects belonging most likely to a same distribution), a density-based clustering technique (e.g., where clusters may be defined as areas of higher density than a remainder of a dataset), and/or the like.

Figure 1F:
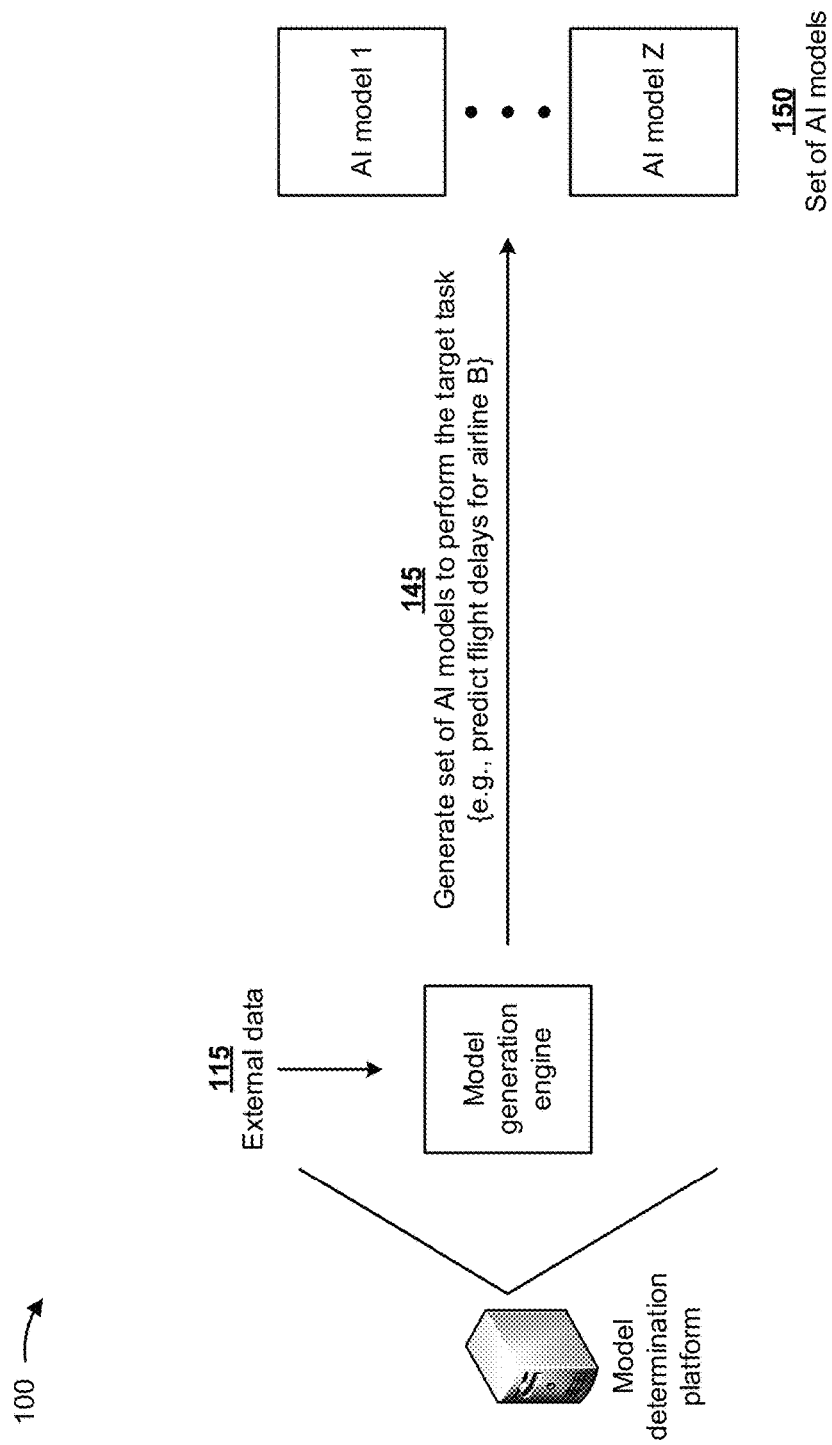

As shown in FIG. 1F, and by reference number 115, a model generation engine, of the model determination platform, may receive the external data. As further shown in FIG. 1F, and by reference number 145, the model generation engine may generate a set of AI models to perform the target task (e.g., to predict flight delays for airline B). In some implementations, the model generation engine may utilize domain expert knowledge data, provided in the external data, to generate the set of AI models. In such implementations, the domain expert knowledge data may include data indicating which types of AI models are useful to perform the target task (e.g., to predict flight delays). As further shown in FIG. 1F, and by reference number 150, the set of AI models may include multiple AI models (e.g., AI model 1 through AI model Z).

In some implementations, the set of AI models may include any type of AI model that may be utilized to perform the target task (e.g., to predict flight delays), such as machine learning models (e.g., decision tree learning models, association rule learning models, neural network models, inductive logic programming models, support vector machine models, and/or the like), deep learning models, and/or the like. In some implementations, the set of AI models may include long short term memory (LSTM) deep learning models, multilayer perception (MLP) deep learning models, and/or combinations of LSTM deep learning models and MLP deep learning models. A LSTM deep learning model may include a simple recurrent neural network that can be used as a building block (e.g., a LSTM block) for a larger recurrent neural network. The LSTM block may be a recurrent network because the LSTM block contains recurrent connections similar to connections in a recurrent neural network. A MLP deep learning model may include a feed-forward artificial neural network with at least three layers of nodes. Except for the input nodes, each node may be a neuron that uses a nonlinear activation function. The MLP deep learning model may utilize a supervised learning technique (e.g., backpropagation for training), and may distinguish data that is not linearly separable.

Figure 1G:
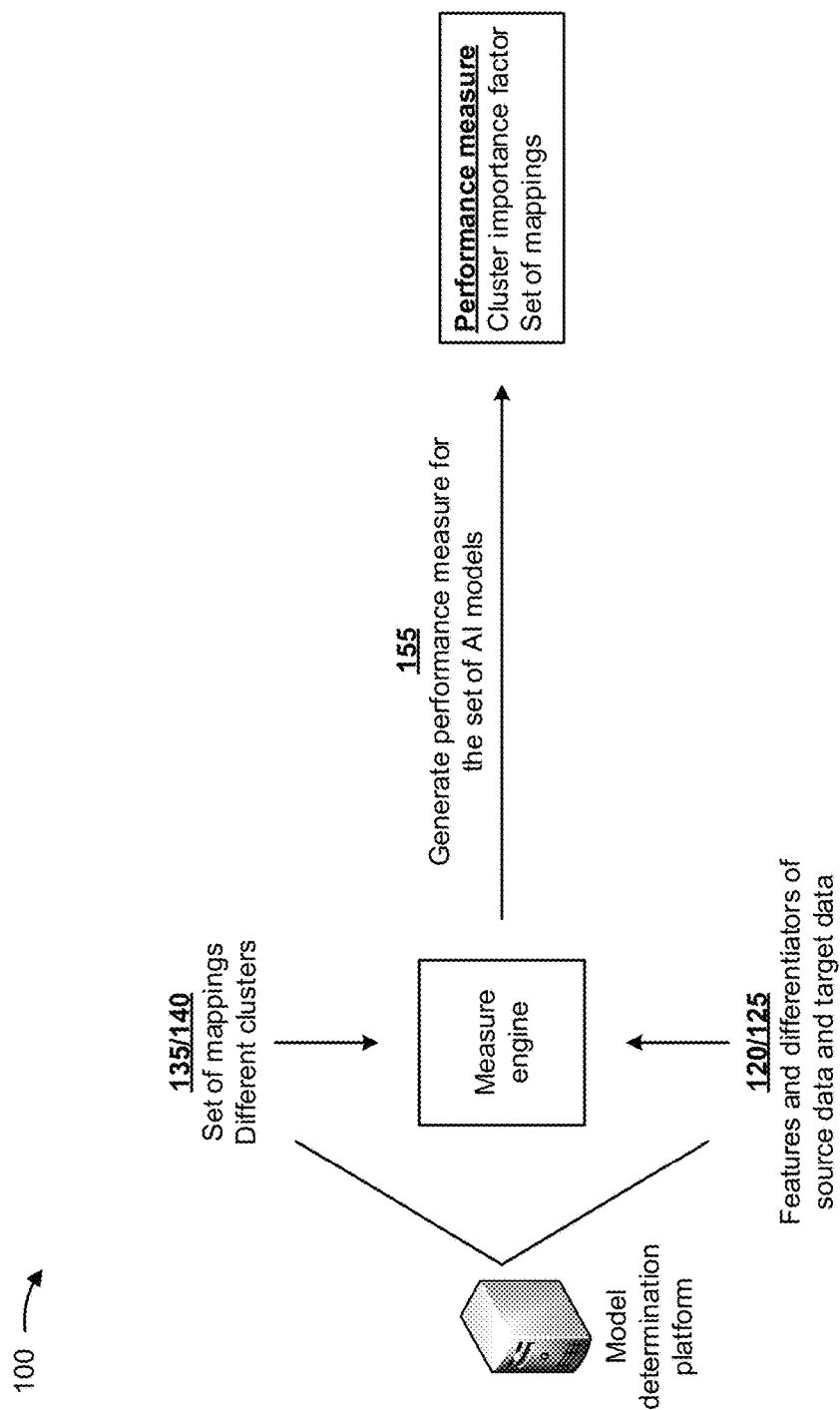

As shown in FIG. 1G, and by reference numbers 120, 125, 135, and 140, a measure engine, of the model determination platform, may receive the features of the source data and the target data, the differentiators between the source data and the target data, the set of mappings, and the different clusters of the source data. As further shown in FIG. 1G, and by reference number 155, the measure engine may generate a performance measure for the set of AI models based on the features of the source data and the target data, the differentiators between the source data and the target data, the set of mappings, and the different clusters of the source data.

In some implementations, the performance measure may depend on the target task, may provide an indication of performance of the AI models on the target dataset (e.g., based on output associated with the target dataset), and may provide an indication of performance of the AI models on the source dataset (e.g., based on output associated with the source dataset). For example, as shown in FIG. 1G, the performance measure may provide an indication of performance of the AI models on the target dataset based on the cluster importance factor, may provide an indication of performance of the AI models on the target dataset based on the set of mappings, and/or the like.

In some implementations, the measure engine may utilize a loss function (e.g., a Euclidean loss function) to determine the performance measure. In such implementations, the loss function may include a function that maps an event or values of one or more variables onto a real number that represents a cost associated with the event. In such implementations, the loss function may include a quadratic loss function, a 0-1 loss function, and/or the like. In some implementations, the loss function ($L_T$) may be associated with the cluster importance factor ($\alpha$), mappings for the source data ($W_S$), mappings for the target data ($W_T$), and an AI model ($f_P$) in the following manner $L_i(W_i, \alpha_i, f_{Pi})$, where $L_i$ may correspond to $L_T$, $W_i$ may correspond to $W_S$ or $W_T$, $\alpha_i$ may correspond to $\alpha$, and $f_{Pi}$ may correspond to $f_P$. The measure engine may compute $W_i$, $\alpha_i$, and $f_{Pi}$ based on back propagation, may update $W_i$, $\alpha_i$, and $f_{Pi}$ based on back propagation, and may determine performance of $W_S$, $W_T$, and $f_P$ based on the computation and the updating.

Figure 1H:
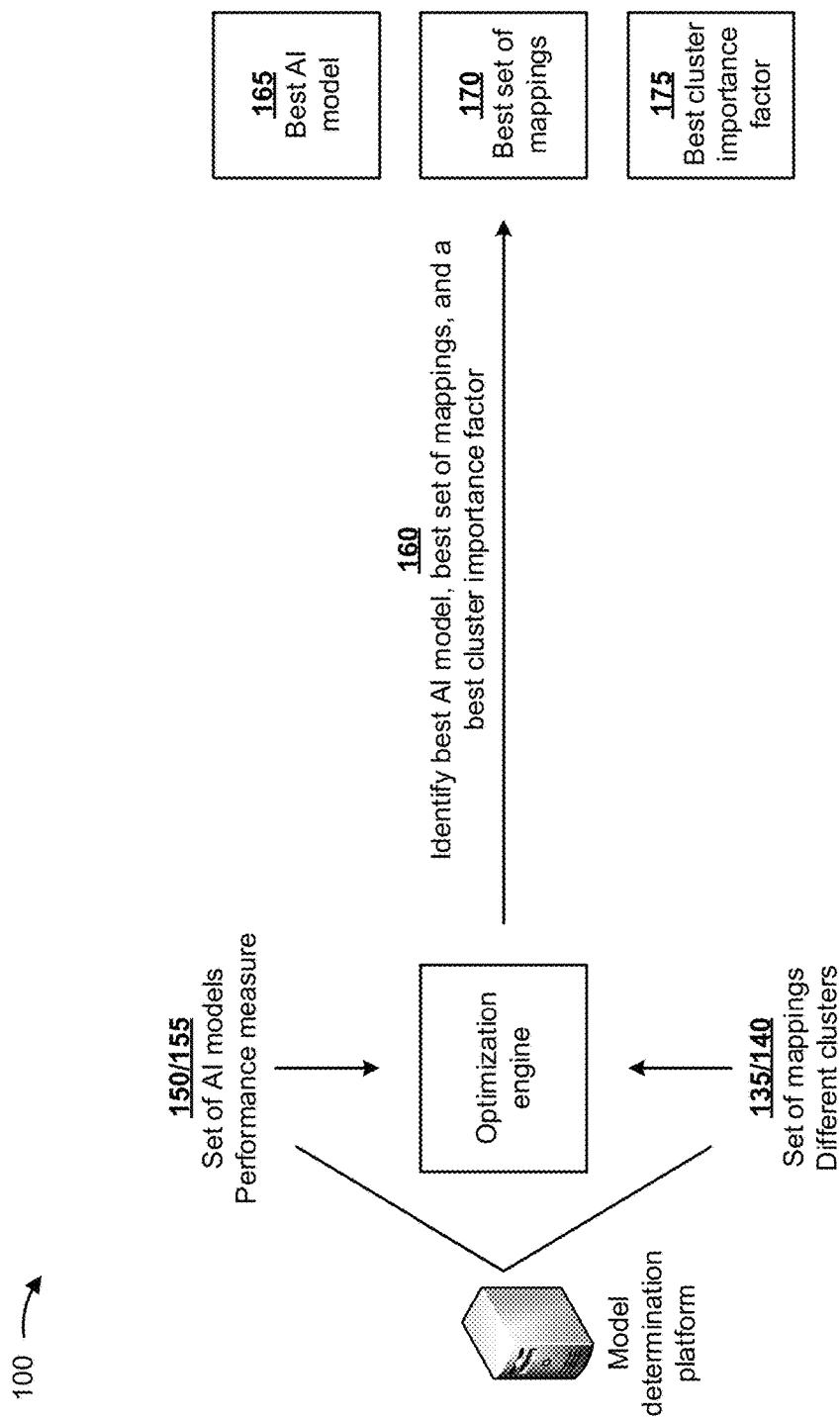

As shown in FIG. 1H, and by reference numbers 135, 140, 150, and 155, an optimization engine, of the model determination platform, may receive the set of mappings, the different clusters of the source data, the set of AI models, and the performance measure. As further shown in FIG. 1H, and by reference number 160, the optimization engine may identify a best AI model, a best set of mappings, and a best cluster performance factor based on the set of mappings, the different clusters of the source data, the set of AI models, and the performance measure.

In some implementations, the best set of mappings and the best cluster performance factor may be utilized by the model determination platform to map particular source data to the target data and to generate enhanced target data. In such implementations, the model determination platform may utilize the enhanced target data to train the best AI model so that the best AI model is trained to handle the target task (e.g., prediction of flight delays for airline B). As further shown in FIG. 1H, and as indicated by reference numbers 165, 170, and 175, the optimization engine may output the best AI model, the best set of mappings, and the best cluster performance factor.

In some implementations, the optimization engine may utilize a stochastic gradient descent (SGD) technique to identify the best AI model, the best set of mappings, and the best cluster performance factor based on the set of mappings, the different clusters of the source data, the set of AI models, and the performance measure. The SGD technique may include a stochastic approximation of a gradient descent optimization (e.g., a first-order iterative optimization technique for finding a minimum of a function), and an iterative method for minimizing an objective function that is written as a sum of differentiable functions (e.g., the SGD technique may find minima or maxima by iteration). In some implementations, the SGD technique may include a momentum method technique, an averaged stochastic gradient descent technique, an adaptive gradient technique, a root mean square propagation technique, an adaptive moment estimation technique, a Kalman-based stochastic gradient descent technique, and/or the like.

In some implementations, the optimization engine may utilize the following equation to identify the best AI model, the best set of mappings, and the best cluster performance factor:

$$L = \Sigma \frac{\alpha_j}{|L_{S_j}|} L(Y_S, f_P(X_{S_j}, W))_S +$$

$$\frac{1}{|L_T|} \Sigma L(Y_T, f_P(X_T, W_T)) + \lambda_S \|W_S\| + \lambda_T \|W_T\| + \lambda_P \|f_P\|,$$

where L may correspond to a loss function, $f_P$ may correspond to the AI model, $Y_S$ may correspond a flight delay associated with the source data, $Y_T$ may correspond to a flight delay associated with the target data, $\alpha_j$ may correspond to a weight (e.g., the cluster importance factor), $\lambda_S$ may correspond to a regularization factor for the source data, $\lambda_T$ may correspond to a regularization factor for the target data, $\lambda_P$ may correspond to a regularization factor for the best AI model, $W_S$ may correspond to mappings for the source data, $W_T$ may correspond to mappings for the target data, Xs may correspond to a predicted fight delay (e.g., calculated by the best AI model) based on the source data, $X_T$ may correspond to a predicted flight delay (e.g., calculated by the best AI model) based on the target data, and ∥ ∥ may correspond to a weighting method for the mapping (e.g., a Frobenius norm of a transformation).

In some implementations, the model determination platform may repeat any of the aforementioned procedures discussed in connection with FIGS. 1A-1G in order to further enhance the target data, and, thus, improve the performance of the best AI model.

Figure 1I:
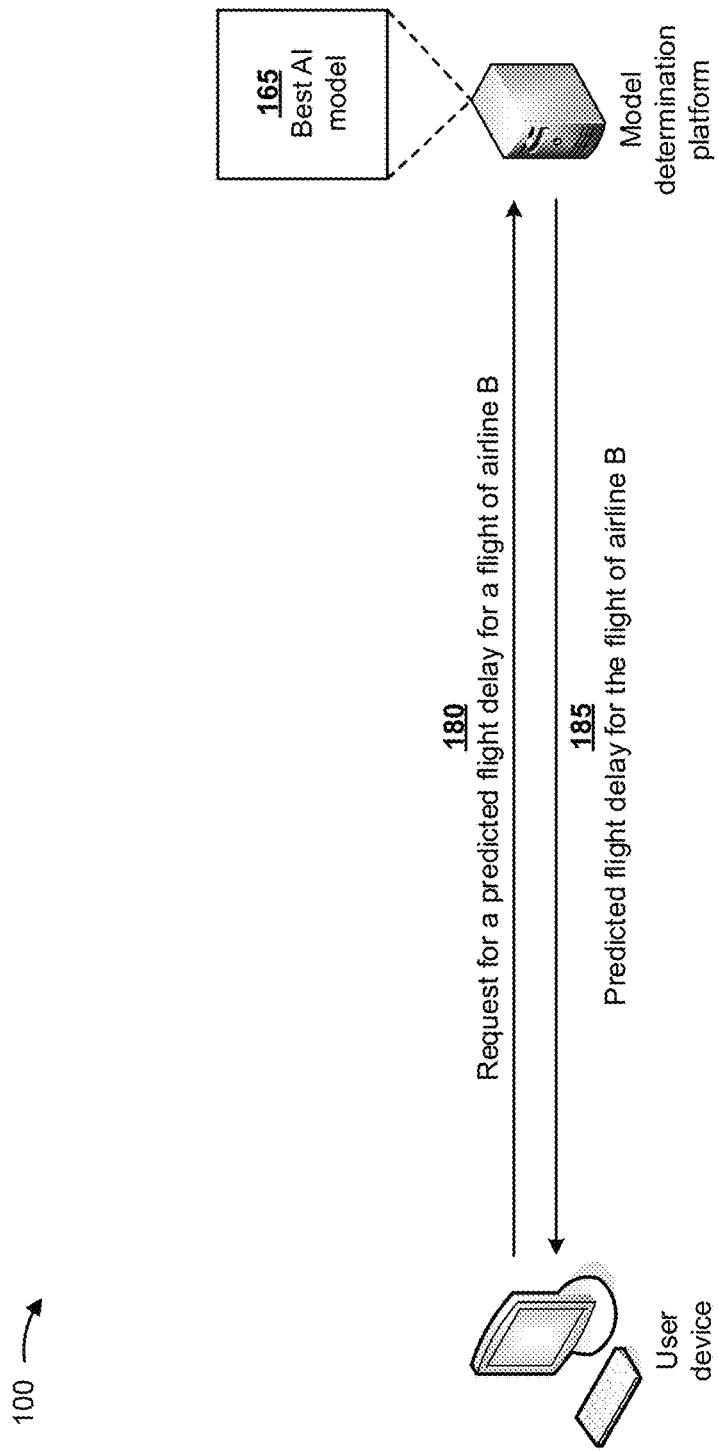

As shown in FIG. 1I, and by reference number 180, the user of the user device may cause the user device to provide, to the model determination platform, a request for a predicted flight delay for a flight of airline B. In some implementations, the model determination platform may receive the request, and may utilize the best AI model to predict a flight delay for the flight of airline B. As further shown in FIG. 1I, and by reference number 185, the model determination platform may provide, to the user device, information indicating the predicted flight delay for the flight of airline B, and the user device may display the information indicating the predicted flight delay for the flight of airline B to a user of the user device (e.g., via a user interface).

In this way, several different stages of the process for determining an AI model for a target domain based on a dataset associated with a source domain are automated, which may remove human subjectivity and waste from the process, and which may improve speed and efficiency of the process and conserve computing resources (e.g., processors, memory, and/or the like). Furthermore, implementations described herein use a rigorous, computerized process to perform tasks or roles that were not previously performed or were previously performed using subjective human intuition or input. These roles may include mapping source domain data to target domain data, determining an AI model for a target domain based on the source domain data, and/or the like. Finally, automating the process for determining an AI model for a target domain based on source domain data conserves computing resources (e.g., processors, memory, and/or the like) that would otherwise be wasted in attempting to determine the AI model.

As indicated above, FIGS. 1A-1I are provided merely as examples. Other examples are possible and may differ from what was described with regard to FIGS. 1A-1I. For example, although FIGS. 1A-1I described the model determination platform being used with airline-related information, in some implementations, the model determination platform may be utilized with other types of information that may benefit from automating the process for determining an AI model for a target domain based on source domain data.

Figure 2:
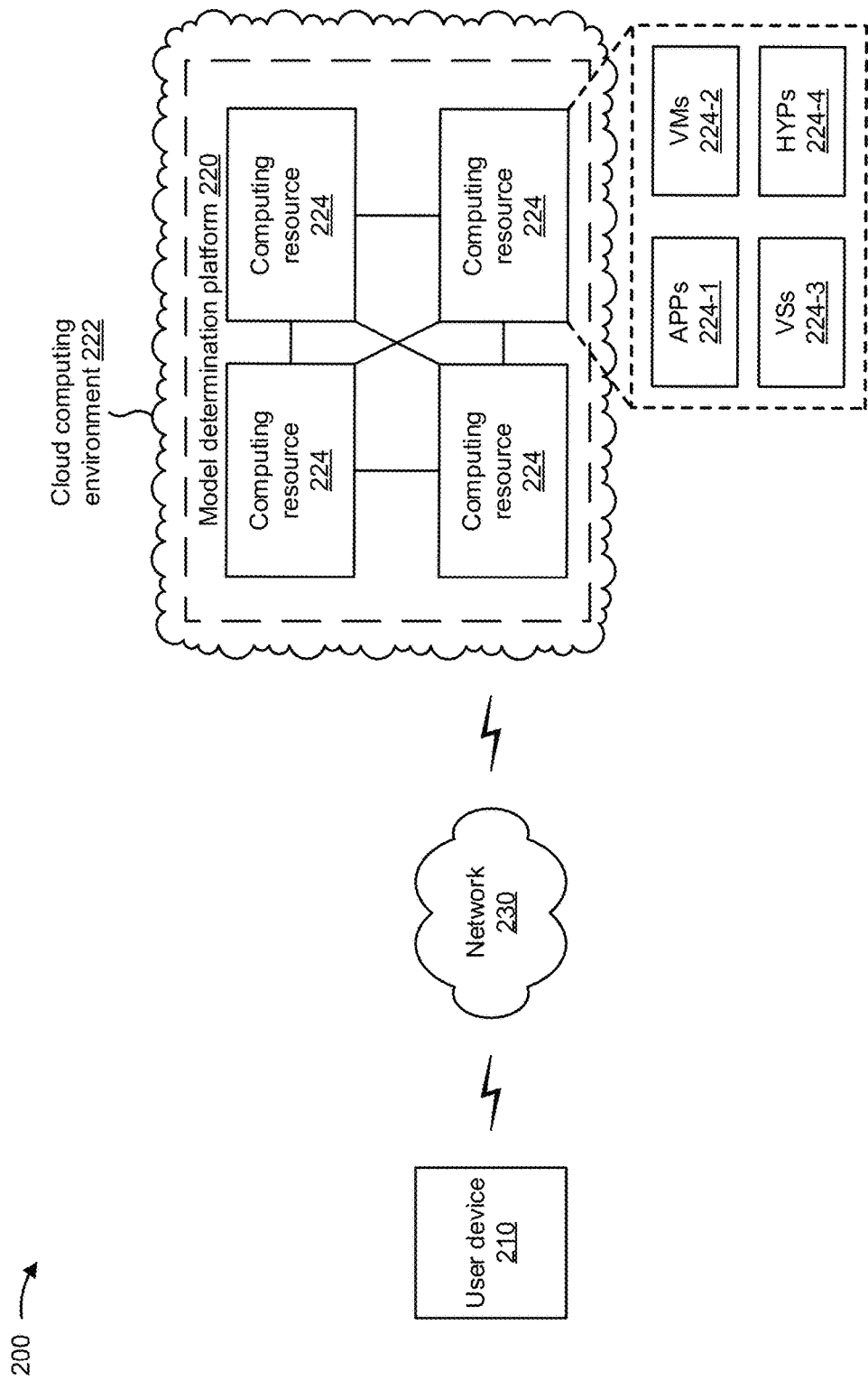
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a model determination platform 220, and a network 230. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 210 may receive information from and/or transmit information to model determination platform 220.

Model determination platform 220 includes one or more devices that determine an artificial intelligence model for a target domain based on a dataset associated with a source domain. In some implementations, model determination platform 220 may be designed to be modular such that certain software components may be swapped in or out depending on a particular need. As such, model determination platform 220 may be easily and/or quickly reconfigured for different uses. In some implementations, model determination platform 220 may receive information from and/or transmit information to one or more user devices 210.

In some implementations, as shown, model determination platform 220 may be hosted in a cloud computing environment 222. Notably, while implementations described herein describe model determination platform 220 as being hosted in cloud computing environment 222, in some implementations, model determination platform 220 may not be cloud-based (i.e., may be implemented outside of a cloud computing environment) or may be partially cloud-based.

Cloud computing environment 222 includes an environment that hosts model determination platform 220. Cloud computing environment 222 may provide computation, software, data access, storage, etc. services that do not require end-user knowledge of a physical location and configuration of system(s) and/or device(s) that hosts model determination platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host model determination platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with model determination platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of user device 210 or an operator of model determination platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
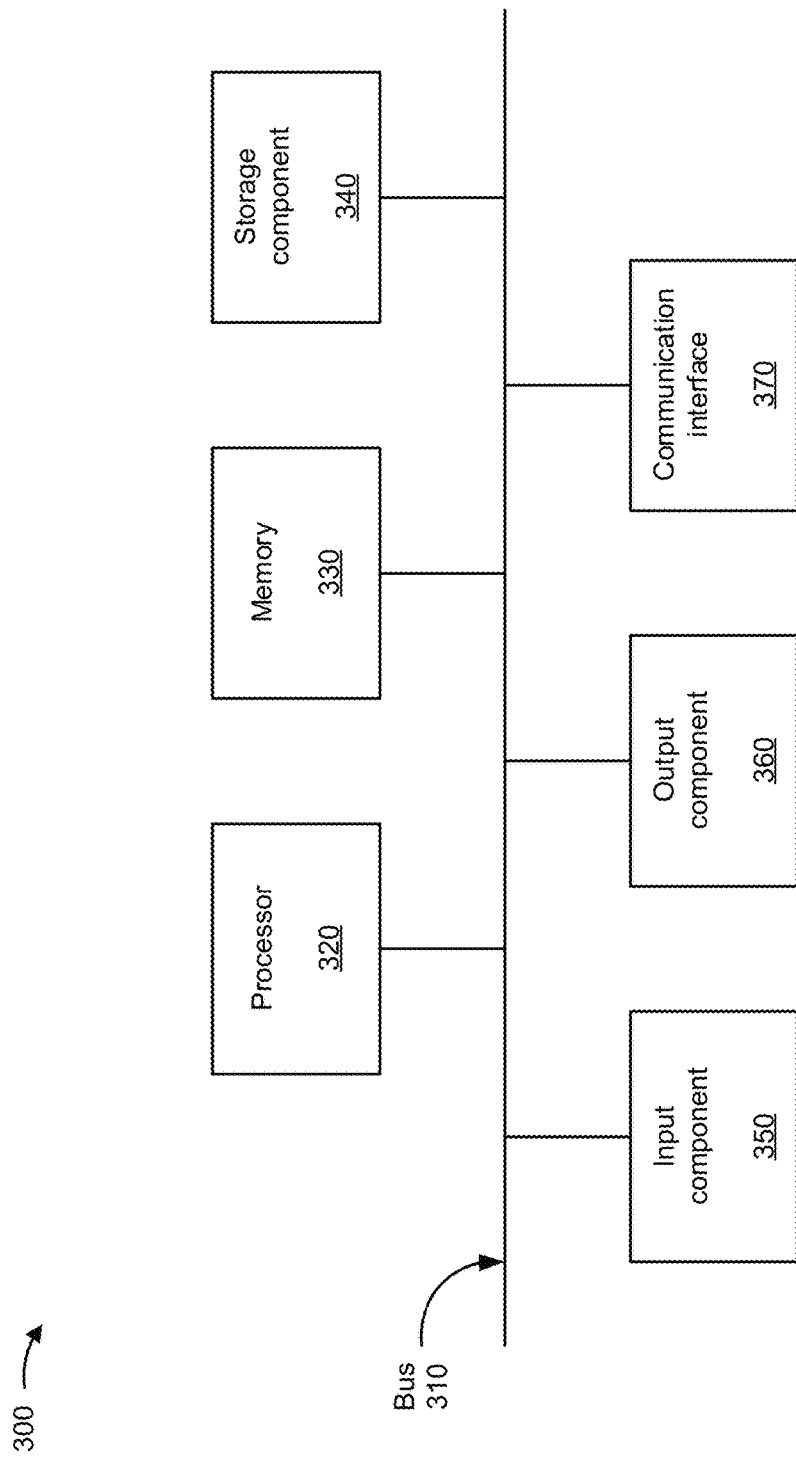
FIG. 3 is a diagram of example components of one or more devices of FIG. 2.

FIG. 3 is a diagram of example components of a device 300. Device 300 may correspond to user device 210, model determination platform 220, and/or computing resource 224. In some implementations, user device 210, model determination platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
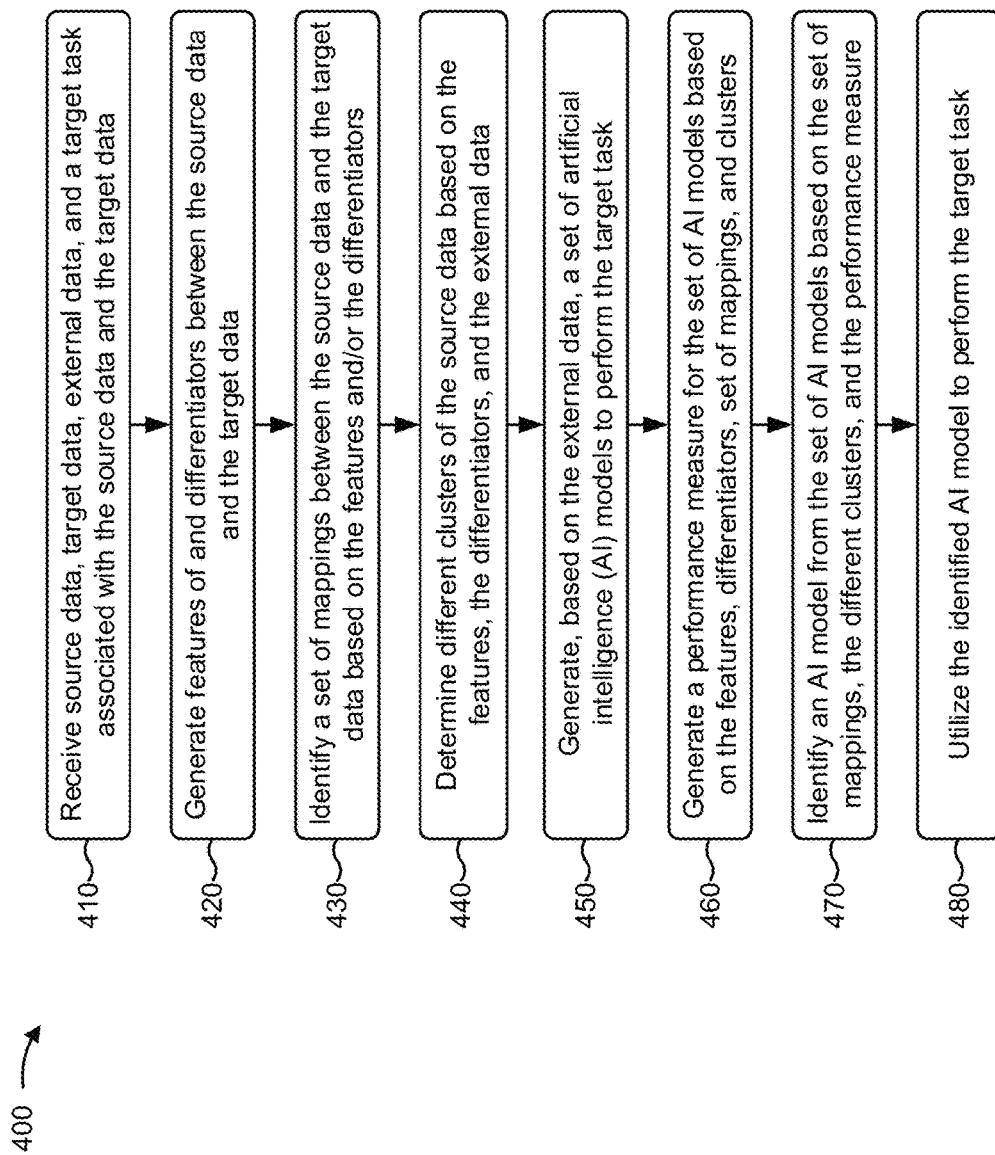
FIG. 4 is a flow chart of an example process for determining an artificial intelligence model for a target domain based on a dataset associated with a source domain.

FIG. 4 is a flow chart of an example process 400 for determining an artificial intelligence model for a target domain based on a dataset associated with a source domain. In some implementations, one or more process blocks of FIG. 4 may be performed by model determination platform 220. In some implementations, one or more process blocks of FIG. 4 may be performed by another device or a group of devices separate from or including model determination platform 220, such as user device 210.

As shown in FIG. 4, process 400 may include receiving source data, target data, external data, and a target task associated with the source data and the target data (block 410). For example, model determination platform 220 (e.g., using computing resource 224, processor 320, communication interface 370, and/or the like) may receive source data, target data, external data, and a target task associated with the source data and the target data. In some implementations, a user of user device 210 (e.g., via a user interface provided to the user) may cause user device 210 to provide, to model determination platform 220, source data for a source domain (e.g., flight data for an airline A, which includes a large, well-defined dataset). In some implementations, the user may cause user device 210 to provide, to model determination platform 220, target data for a target domain that is different than the source domain (e.g., flight data for an airline B, which includes a small, undefined dataset). In some implementations, the source data and the target data may not be stored in user device 210, but user device 210 may cause the source data and the target data to be provided from a resource, storing the source data and the target data, to model determination platform 220. In some implementations, model determination platform 220 may receive the source data and the target data, and may store the source data and the target data in a memory associated with model determination platform 220.

In some implementations, the source data may include data, associated with the source domain, which may be used to train AI models. For example, if the source domain relates to airline A, the source data may include flight data for airline A, flight delay data for airline A, passenger data for airline A, airport data for airline A, baggage data for airline A, and/or the like.

In some implementations, the target data may include data, associated with the target domain, which may be used to train AI models. For example, if the target domain relates to airline B, the source data may include flight data for airline B, flight delay data for airline B, passenger data for airline B, airport data for airline B, baggage data for airline B, and/or the like.

In some implementations, model determination platform 220 may receive external data, related to the source domain and the target domain, from an external source. In some implementations, the external data may include weather data, calendar data, social media data, a target task, expert data, and/or the like, in the context of airline-related information. In some implementations, the target task may be provided by user device 210 to the model determination platform 220.

In this way, model determination platform 220 may receive the source data, the target data, the external data, and the target task associated with the source data and the target data.

As further shown in FIG. 4, process 400 may include generating features of and differentiators between the source data and the target data (block 420). For example, model determination platform 220 (e.g., using computing resource 224, processor 320, and/or the like) may generate features of and differentiators between the source data and the target data. In some implementations, a feature engine, of model determination platform 220, may receive the source data, the target data, and the external data. In some implementations, model determination platform 220 may convert the source data, the target data, and the external data from a format received by model determination platform 220 into another format.

In some implementations, the feature engine may generate features of the source data and the target data based on the source data, the target data, and the external data. In some implementations, the features of the source data and the target data may include a feature indicating that airline A provides passenger gender information and airline B does not, a feature indicating that airline A and airline B both fly to city X, a feature indicating weather for city X, and/or the like.

In some implementations, the feature engine may utilize a schema matching technique to generate the features of the source data and the target data, as described above in connection with FIGS. 1A-1I. In some implementations, the feature engine may utilize other techniques to generate the features of the source data and the target data, such as machine learning techniques, and/or the like. For example, the feature engine may utilize a Gaussian model (e.g., a Bayesian or multivariate Gaussian mixture model) to generate the features of the source data and the target data. The multivariate Gaussian mixture model may include a model used to fit a vector of unknown parameters or multivariate normal distributions.

In some implementations, a differentiator engine, of model determination platform 220, may receive the features of the source data and the target data. In some implementations, the differentiator engine may generate differentiators between the source data and the target data based on the features of the source data and the target data. In some implementations, the differentiators between the source data and the target data may include data indicating granularity data misalignment, data indicating type data misalignment, data indicating coverage data misalignment, and/or the like.

In some implementations, the differentiator engine may utilize the schema matching technique to generate the differentiators between the source data and the target data. In some implementations, the schema matching technique may analyze and compare the schema to determine correspondences among concepts and to determine the differences among the concepts (e.g., the differentiators between the source data and the target data). In some implementations, the differentiator engine may utilize other techniques to generate the differentiators between the source data and the target data, such as machine learning techniques, and/or the like In this way, model determination platform 220 may generate the features of and the differentiators between the source data and the target data.

As further shown in FIG. 4, process 400 may include identifying a set of mappings between the source data and the target data based on the features and/or the differentiators (block 430). For example, model determination platform 220 (e.g., using computing resource 224, processor 320, and/or the like) may identify a set of mappings between the source data and the target data based on the features and/or the differentiators. In some implementations, a mapping function engine, of model determination platform 220, may receive the differentiators between the source data and the target data. In some implementations, the mapping function engine may identify a set of mappings between the source data and the target data based on the differentiators between the source data and the target data. In some implementations, the set of mappings between the source data and the target data may include mappings that may be used to embed or transfer data from the source data to the target data.

In some implementations, the mapping function engine may utilize a data mapping technique to identify the set of mappings between the source data and the target data. The data mapping technique may creating data element mappings between two distinct data models (e.g., the source data and the target data). In some implementations the data mapping technique may include a data-driven mapping technique, a semantic mapping technique, and/or the like. In some implementations, the mapping function engine may utilize a nonlinear data mapping technique, which utilizes neural networks, to identify the set of mappings between the source data and the target data.

In this way, model determination platform 220 may identify the set of mappings between the source data and the target data based on the features and/or the differentiators.

As further shown in FIG. 4, process 400 may include determining different clusters of the source data based on the features, the differentiators, and the external data (block 440). For example, model determination platform 220 (e.g., using computing resource 224, processor 320, and/or the like) may determine different clusters of the source data based on the features, the differentiators, and the external data. In some implementations, a cluster engine, of model determination platform 220, may receive the external data, the features of the source data and the target data, the differentiators between the source data and the target data, and the set of mappings. In some implementations, the cluster engine may determine different clusters of the source data based on the external data, the features of the source data and the target data, the differentiators between the source data and the target data. In some implementations, the cluster engine may utilize data associated with the target task from the external data when determining the different clusters of the source data.

In some implementations, each cluster of the source data may include source data with features that may be grouped together and used later for transferring to the target data. In some implementations, determination of the different clusters of the source data may prevent a negative transfer (e.g., where the source data may not be beneficial to the target data and may cause inaccuracies). In some implementations, the cluster engine may associate a cluster importance factor (e.g., a weighting factor that may be determined through a relationship analysis based on relevance of information) to each cluster.

In some implementations, the cluster engine may utilize a cluster analysis technique to determine the different clusters of the source data. The cluster analysis technique may include grouping a set of data in such a way that data in a same group (e.g., a cluster) is more similar to each other than to data in other groups (e.g., clusters). In some implementations, the cluster analysis technique may include a hierarchical clustering technique, a centroid-based clustering technique, a distribution-base clustering technique, a density-based clustering technique, and/or the like.

In this way, model determination platform 220 may determine the different clusters of the source data based on the features, the differentiators, and the external data.

As further shown in FIG. 4, process 400 may include generating, based on the external data, a set of artificial intelligence (AI) models to perform the target task (block 450). For example, model determination platform 220 (e.g., using computing resource 224, processor 320, and/or the like) may generate, based on the external data, a set of AI models to perform the target task. In some implementations, a model generation engine, of model determination platform 220, may receive the external data. In some implementations, the model generation engine may generate a set of AI models to perform the target task. In some implementations, the model generation engine may utilize domain expert knowledge data, provided in the external data, to generate the set of AI models. In such implementations, the domain expert knowledge data may include data indicating which types of AI models are useful to perform the target task (e.g., to predict flight delays).

In some implementations, the set of AI models may include any type of AI model that may be utilized to perform the target task (e.g., to predict flight delays), such as machine learning models, deep learning models, and/or the like. In some implementations, the set of AI models may include LSTM deep learning models, MLP deep learning models, and/or combinations of LSTM deep learning models and MLP deep learning models. A LSTM deep learning model may include a simple recurrent neural network that can be used as a building block (e.g., a LSTM block) for a larger recurrent neural network. A MLP deep learning model may include a feedforward artificial neural network with at least three layers of nodes.

In this way, model determination platform 220 may generate, based on the external data, the set of AI models to perform the target task.

As further shown in FIG. 4, process 400 may include generating a performance measure for the set of AI models based on the features, the differentiators, the set of mappings, and the different clusters (block 460). For example, model determination platform 220 (e.g., using computing resource 224, processor 320, and/or the like) may generate a performance measure for the set of AI models based on the features, the differentiators, the set of mappings, and the different clusters. In some implementations, a measure engine, of model determination platform 220, may receive the features of the source data and the target data, the differentiators between the source data and the target data, the set of mappings, and the different clusters of the source data. In some implementations, the measure engine may generate a performance measure for the set of AI models based on the features of the source data and the target data, the differentiators between the source data and the target data, the set of mappings, and the different clusters of the source data.

In some implementations, the performance measure may depend on the target task, may provide an indication of performance of the AI models on the target dataset (e.g., based on output associated with the target dataset), and may provide an indication of performance of the AI models on the source dataset (e.g., based on output associated with the source dataset).

In some implementations, the measure engine may utilize a loss function (e.g., a Euclidean loss function) to determine the performance measure. In such implementations, the loss function may include a function that maps an event or values of one or more variables onto a real number that represents a cost associated with the event. In such implementations, the loss function may include a quadratic loss function, a 0-1 loss function, and/or the like.

In this way, model determination platform 220 may generate the performance measure for the set of AI models based on the features, the differentiators, the set of mappings, and the different clusters.

As further shown in FIG. 4, process 400 may include identifying an AI model from the set of AI models based on the set of mappings, the different clusters, and the performance measure (block 470). For example, model determination platform 220 (e.g., using computing resource 224, processor 320, and/or the like) may identify an AI model from the set of AI models based on the set of mappings, the different clusters, and the performance measure. In some implementations, an optimization engine, of model determination platform 220, may receive the set of mappings, the different clusters of the source data, the set of AI models, and the performance measure. In some implementations, the optimization engine may identify a best AI model, a best set of mappings (e.g., a refined set of mappings that are refined based on the performance measure), and a best cluster performance factor based on the set of mappings, the different clusters of the source data, the set of AI models, and the performance measure.

In some implementations, the best set of mappings and the best cluster performance factor may be utilized by the model determination platform to map particular source data to the target data and to generate enhanced target data. In such implementations, the model determination platform may utilize the enhanced target data to train the best AI model so that the best AI model is trained to handle the target task.

In some implementations, the optimization engine may utilize a SGD technique to identify the best AI model, the best set of mappings, and the best cluster performance factor based on the set of mappings, the different clusters of the source data, the set of AI models, and the performance measure. The SGD technique may include a stochastic approximation of a gradient descent optimization, and an iterative method for minimizing an objective function that is written as a sum of differentiable functions. In some implementations, the SGD technique may include a momentum method technique, an averaged stochastic gradient descent technique, an adaptive gradient technique, a root mean square propagation technique, an adaptive moment estimation technique, a Kalman-based stochastic gradient descent technique, and/or the like.

In this way, model determination platform 220 may identify the AI model from the set of AI models based on the set of mappings, the different clusters, and the performance measure.

As further shown in FIG. 4, process 400 may include utilizing the identified AI model to perform the target task (block 480). For example, model determination platform 220 (e.g., using computing resource 224, processor 320, and/or the like) may utilize the identified AI model to perform the target task. In some implementations, a user of user device 210 may cause user device 210 to provide, to model determination platform 220, a request for a predicted flight delay for a flight of airline B. In some implementations, model determination platform 220 may receive the request, and may utilize the best AI model to predict a flight delay for the flight of airline B. In some implementations, model determination platform 220 may provide, to user device 210, information indicating the predicted flight delay for the flight of airline B, and user device 210 may display the information indicating the predicted flight delay for the flight of airline B to a user of user device 210 (e.g., via a user interface).

In this way, model determination platform 220 may utilize the identified AI model to perform the target task.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein provide a model determination platform that determines an AI model for a target domain based on a dataset associated with a source domain that is different than the target domain. For example, the model determination platform may receive source data (e.g., associated with a source domain), target data (e.g., associated with a target domain that is different than the target domain), external data (e.g., weather data, calendar data, and/or the like), and a target task associated with the source data and the target data. The model determination platform may generate features of and differentiators between the source data and the target data, and may identify a set of mappings between the source data and the target data based on the features. The model determination platform may determine different clusters of the source data based on the features, the differentiators, and/or the external data, and may generate, based on the external data, a set of AI models to perform the target task. The model determination platform may generate a performance measure for the set of AI models based on the features, the differentiators, the set of mappings, and/or the different clusters, and may identify an AI model from the set of AI models based on the set of mappings, the different clusters, and/or the performance measure. The model determination platform may utilize the identified AI model to perform the target task.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
receive source data, target data, external data, and a target task associated with the source data and the target data,
the external data including at least one of:
weather data,
calendar data,
social media data, or
expert data, and
the external data being received from one or more resource devices;
generate features of and differentiators between the source data and the target data,
the differentiators including data indicating at least one of:
granularity data misalignment,
type data misalignment, or
coverage data misalignment;
identify a set of mappings between the source data and the target data based on the features of and the differentiators between the source data and the target data,
each mapping being dependent upon a level of misalignment between the source data and the target data,
the set of mappings being used to embed or transfer data from the source data to the target data;
determine different clusters of the source data based on the external data and the features of and the differentiators between the source data and the target data;
generate, based on the external data, a set of artificial intelligence models as candidates to perform the target task;
generate a performance measure for the set of artificial intelligence models based on the features of and the differentiators between the source data and the target data, and based on the external data;
refine the set of mappings based on the different clusters of the source data and based on the performance measure to generate enhanced target data;
identify an artificial intelligence model, from the set of artificial intelligence models, to perform the target task based on the different clusters of the source data and based on the performance measure,
the enhanced target data being used to train the identified artificial intelligence model;
receive a request to perform the target task;
utilize the trained identified artificial intelligence model to perform the target task based on the request; and
transmit information associated with the target task to a user device.

2. The device of claim 1, where the target task includes determining a prediction, and the one or more processors are further to:
utilize the trained identified artificial intelligence model to determine the prediction.

3. The device of claim 1, where the one or more processors, when generating the features of and the differentiators between the source data and the target data, are to:
utilize a schema matching technique to generate the features of and the differentiators between the source data and the target data.

4. The device of claim 1, where the one or more processors, when identifying the set of mappings, are to:
utilize one of a data mapping technique or a nonlinear data mapping technique, which utilizes neural networks, to identify the set of mappings between the source data and the target data.

5. The device of claim 1, where the one or more processors, when determining the different clusters of the source data, are to:
utilize a cluster analysis technique to determine the different clusters of the source data.

6. The device of claim 1, where the one or more processors, when identifying the artificial intelligence model, are to:
utilize a stochastic gradient descent (SGD) technique to identify the artificial intelligence model.

7. The device of claim 1, where the one or more processors, when generating the features of and the differentiators between the source data and the target data, are to:
utilize a Bayesian or multivariate Gaussian mixture model to generate the features of and the differentiators between the source data and the target data.

8. A non-transitory computer-readable medium storing instructions, the instructions comprising:
one or more instructions that, when executed by one or more processors, cause the one or more processors to:
receive source data, target data, external data, and a target task associated with the source data and the target data,
the external data including at least one of:
weather data,
calendar data,
social media data, or
expert data, and
the external data being received from one or more resource devices,
the source data being associated with a source domain,
the target data being associated with a target domain that is different than the source domain, and
the external data being associated with the source data and the target data;
generate features of the source data and the target data;
generate differentiators between the source data and the target data based on the features of the source data and the target data,
the differentiators including data indicating at least one of:
granularity data misalignment,
type data misalignment, or
coverage data misalignment;
identify a set of mappings between the source data and the target data based on the features of the source data and the target data and the differentiators between the source data and the target data,
each mapping being dependent upon a level of misalignment between the source data and the target data,
the set of mappings being used to embed or transfer data from the source data to the target data;
determine different clusters of the source data based on the external data, the features of the source data and the target data, and the differentiators between the source data and the target data;
generate, based on the external data, a set of artificial intelligence models as candidates to perform the target task;
generate a performance measure for the set of artificial intelligence models based on the features of the source data and the target data, the differentiators between the source data and the target data, the set of mappings, and the different clusters of the source data;
refine the set of mappings based on the different clusters of the source data and based on the performance measure to generate enhanced target data;
identify an artificial intelligence model, from the set of artificial intelligence models, to perform the target task based on the set of mappings, the different clusters of the source data, and the performance measure,
the enhanced target data being used to train the identified artificial intelligence model;
receive a request to perform the target task; and
utilize the trained identified artificial intelligence model to perform the target task based on the request.

9. The non-transitory computer-readable medium of claim 8, where the target task includes determining a prediction and the instructions further comprise:
one or more instructions that, when executed by the one or more processors, cause the one or more processors to:
utilize the identified artificial intelligence model to determine the prediction.

10. The non-transitory computer-readable medium of claim 8, where the one or more instructions, that cause the one or more processors to generate the features of the source data and the target data, cause the one or more processors to:
utilize a schema matching technique to generate the features of the source data and the target data.

11. The non-transitory computer-readable medium of claim 8, where the one or more instructions, that cause the one or more processors to identify the set of mappings, cause the one or more processors to:
utilize one of a data mapping technique or a nonlinear data mapping technique, which utilizes neural networks, to identify the set of mappings between the source data and the target data.

12. The non-transitory computer-readable medium of claim 8, where the one or more instructions, that cause the one or more processors to determine the different clusters of the source data, cause the one or more processors to:
utilize a cluster analysis technique to determine the different clusters of the source data.

13. The non-transitory computer-readable medium of claim 8, where the one or more instructions, that cause the one or more processors to identify the artificial intelligence model, cause the one or more processors to:
utilize a stochastic gradient descent (SGD) technique to identify the artificial intelligence model.

14. The non-transitory computer-readable medium of claim 8, where the one or more instructions that cause the one or more processors to determine the different clusters of the source data, cause the one or more processors to:
utilize at least one of:
a hierarchical clustering technique,
a centroid-based clustering technique,
a distribution-based clustering technique, or
a density-based clustering technique.

15. A method, comprising:
receiving, by a device, source data, target data, external data, and a target task associated with the source data and the target data, the external data including at least one of:
  weather data,
  calendar data,
  social media data, or
  expert data, and
the external data being received from one or more resource devices;
generating, by the device, features of and differentiators between the source data and the target data,
  the differentiators including data indicating at least one of:
    granularity data misalignment,
    type data misalignment, or
    coverage data misalignment;
  identifying, by the device, a set of mappings between the source data and the target data based on the features of and the differentiators between the source data and the target data,
    each mapping being dependent upon a level of misalignment between the source data and the target data,
    the set of mappings being used to embed or transfer data from the source data to the target data;
determining, by the device, different clusters of the source data based on the external data and the features of and the differentiators between the source data and the target data;
generating, by the device and based on the external data, a set of artificial intelligence models as candidates to perform the target task;
generating, by the device, a performance measure for the set of artificial intelligence models based on the features of and the differentiators between the source data and the target data, the set of mappings, and the different clusters of the source data;
refining, by the device and based on the different clusters of the source data and based on the performance measure, the set of mappings to generate enhanced target data;
identifying, by the device, an artificial intelligence model, from the set of artificial intelligence models, to perform the target task based on the set of mappings, the different clusters of the source data, and the performance measure,
  the enhanced target data being used to train the identified artificial intelligence model;
receiving, by the device, a request to perform the target task; and
utilizing, by the device the trained identified artificial intelligence model to perform the target task based on the request.

16. The method of claim 15, where the target task includes determining a prediction, and the method further comprises:
  utilizing the trained identified artificial intelligence model to determine the prediction.

17. The method of claim 15, where generating the features of and the differentiators between the source data and the target data comprises:
  utilizing a schema matching technique to generate the features of and the differentiators between the source data and the target data.

18. The method of claim 15, where identifying the set of mappings comprises:
  utilizing one of a data mapping technique or a nonlinear data mapping technique, which utilizes neural networks, to identify the set of mappings between the source data and the target data.

19. The method of claim 15, where determining the different clusters of the source data comprises:
  utilizing a cluster analysis technique to determine the different clusters of the source data.

20. The method of claim 15, where generating the performance measure for the set of artificial intelligence models comprises:
  utilizing at least one of:
    a Euclidean loss function to determine the performance measure,
    a quadratic loss function to determine the performance measure, or
    a 0-1 loss function to determine the performance measure.

* * * * *